Figure 1:
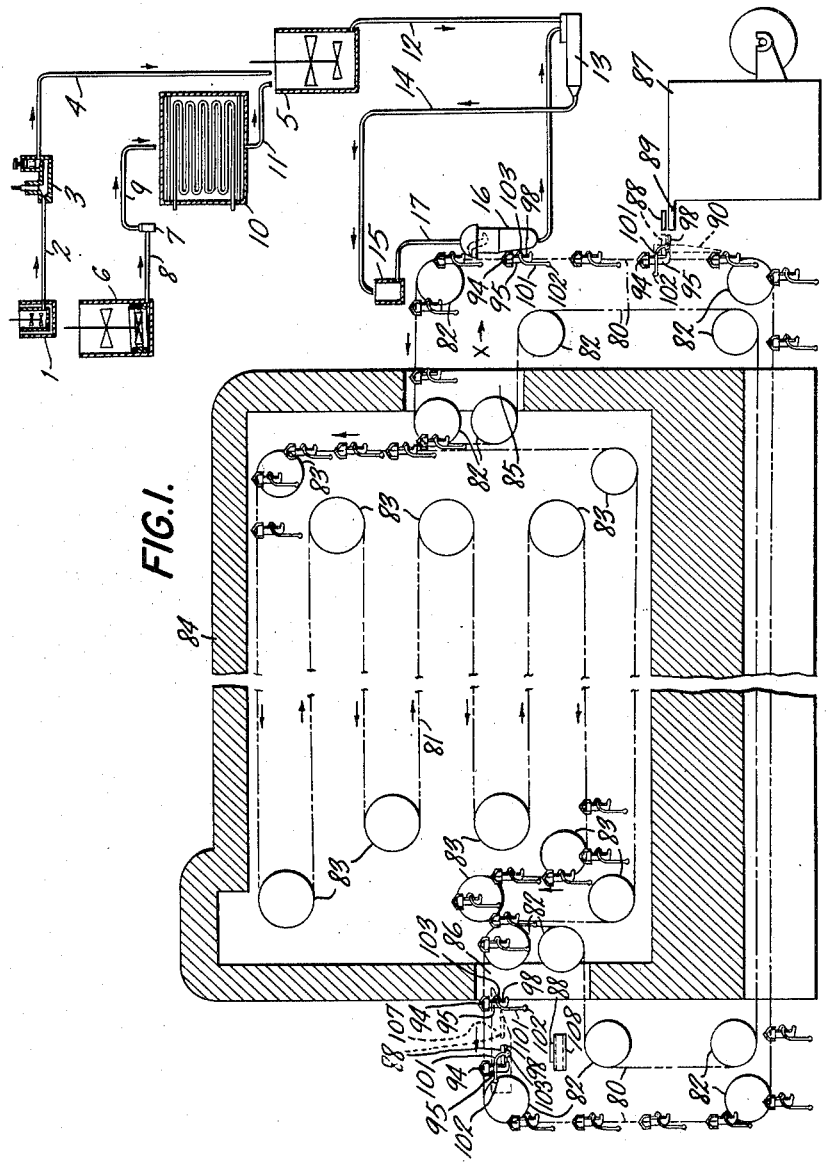

INVENTORS
GEORGE ALEC STONESTREET
GEORGE HAZELL SEARLE
ATTORNEYS

Jan. 29, 1957  G. A. STONESTREET ET AL  2,779,357
APPARATUS FOR FILLING LIQUID OR PLASTIC
SUBSTANCES INTO CONTAINERS
Filed Aug. 31, 1953  5 Sheets-Sheet 3

INVENTORS
GEORGE ALEC STONESTREET
GEORGE HAZELL SEARLE
BY
ATTORNEYS

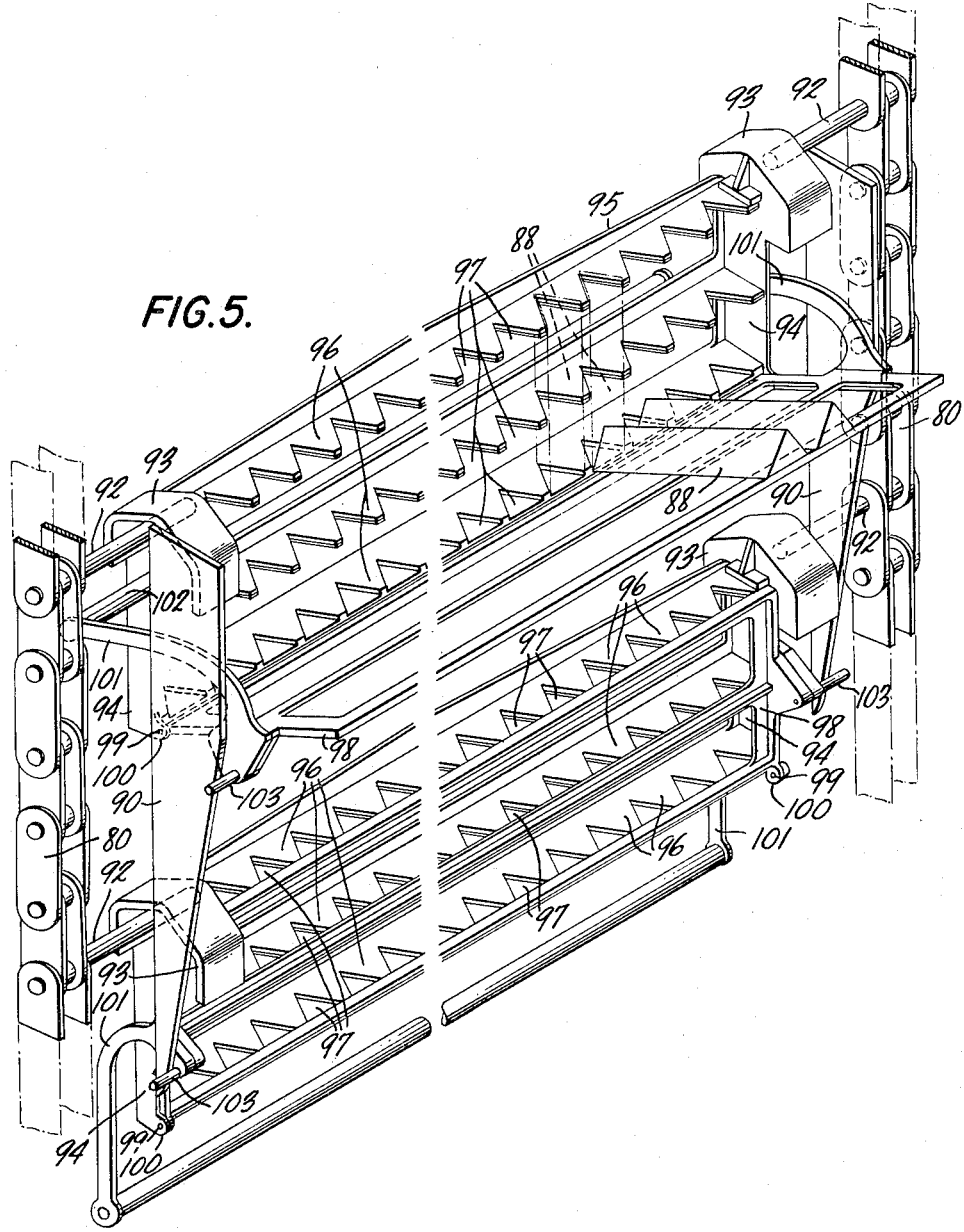

United States Patent Office 2,779,357
Patented Jan. 29, 1957

2,779,357

APPARATUS FOR FILLING LIQUID OR PLASTIC SUBSTANCES INTO CONTAINERS

George Alec Stonestreet, Penn, and George Hazell Searle, Kew Gardens, Richmond, England, assignors to T. Wall & Sons Limited, London, England, a British company Application August 31, 1953, Serial No. 377,588

Claims priority, application Great Britain September 5, 1952

16 Claims. (Cl. 141—82)

This invention relates to a method of and apparatus for filling a flowable substance, such as a liquid, plastic or free flowing powder, into a container. More particularly it relates to a method and apparatus for carrying out the steps of filling edible liquid confections into substantially leak-proof bags and freezing the confection whilst contained in the bags.

The present invention provides a method for filling a flowable substance into a container which includes the steps of moving past a reservoir for the substance a container with the axis passing through its open and closed ends substantially vertical, and filling a predetermined quantity of the substance from the reservoir into the moving container.

A predetermined volume of substance may be withdrawn from the reservoir and transferred to a point directly in the path of and above the moving container from where it is allowed to flow substantially vertically downwards into the moving container. During withdrawal, the volume may be moved through an arc of a circle to a point above the surface of the substance in the reservoir and then may be transferred from this point to a point outside the periphery of the reservoir and in the path of the moving container along a downwardly sloping path.

A succession of rows of containers may be so filled whilst moving upwards by a succession of withdrawals and transfers of rows of substantially equal volumes from the reservoir carried out in synchronisation with the movement of the rows of containers to be filled.

The reservoir may move downwards along a path parallel to that of the moving container whilst withdrawal of a row of substantially equal volumes of substance is taking place, and may move upwards along a path parallel to that of the containers whilst the withdrawn row of volumes of substance is being transferred to a row of containers.

A row of containers to be filled may be supported by a suitable carrier, for example, a carrier such as is described in co-pending application Serial No. 377,629, and a succession of such carriers may travel round an endless path which, if desired, may pass through an apparatus for processing the containers or their contents after filling. A row of containers may be placed on the carrier whilst it is moving vertically and before it reaches the reservoir for the substance. The row may be removed from the carrier after the carrier has passed through the processing appaatus.

In co-pending application Serial No. 279,329 there is described a process of packaging frozen confections which comprises the steps of filling the confection in the liquid or plastic state into a substantially leak-proof bag of flexible material impermeable to and incapable of absorbing the liquid or plastic confection, and freezing the confection whilst contained in the bag.

One particular embodiment of the method of filling containers according to the present invention is particular- ly suitable for enabling the method of packaging of this co-pending application to be carried out continuously and on a commercial scale.

In the particular embodiment referred to, the containers comprise leak-proof bags of flexible material impermeable to and incapable of absorbing the liquid or plastic confection. The succession of such bags may be moved substantially vertically past the source with the planes of their open ends substantially perpendicular to the direction of movement, the liquid or plastic confection from the source being filled into the bag.

The bags may be made on a suitable bag making machine and assembled in a horizontal row when they emerge from the machine. When a sufficient number of bags have been assembled to form one such row, the row may be transferred to a carrier moving vertically past the assembly point, the horizontal assembly of the bags being maintained during transfer. After transfer and subsequent movement of the carrier past the point of assembly of the bags, the row may be rotated through 90° until the bags are all vertical.

When carrying out the method of co-pending application Serial No. 279,329, the endless path traversed by the carriers may pass through a refrigerating chamber to enable the contents of the bags to be frozen therein after filling.

The path of the carriers may follow a zig-zag course through the refrigerating chamber from top to bottom thereof. All the bags in the row may be simultaneously removed from the carrier after the carrier emerges from the chamber and the bags may then be transferred to a machine for sealing their open ends with a readily opened seal.

The present invention also provides apparatus for filling a flowable substance into a container which apparatus includes a reservoir for the substance, a conveyor for moving past the reservoir the container with the axis passing through its open and closed ends substantially vertical, and withdrawal means for withdrawing from said reservoir a quantity of substance and transferring the withdrawn substance into the moving container from a point in the path of and above the moving container.

The conveyor may comprise a carrier arranged to support the container in an upright position in combination with means for moving such a carrier, for example, a pair of parallel chains supporting the carrier on either side and arranged to move vertically upwards past the reservoir. A succession of such carriers may be so supported and arranged to move around an endless path. Each carrier may be adapted to carry a row of containers.

A suitable carrier which is described in co-pending application Serial No. 377,629 consists of a backing member and a landing member pivotably connected thereto, which members are capable of being held face-to-face under the action of a counterpoise so as to support a container between them.

A succession of such carriers may be suspended between a pair of parallel chains with the backing member of each carrier in the vertical plane by spaced-apart pins on the chains fitting into trunnions on the carrier. The backing member may be a rectangular frame suitably serrated to accommodate the cross sectional shape of the container. Means are provided to cause the landing member to rotate away from the backing member against the action of the counterpoise, preferably through 90°. For example, such means may be a cam follower on the landing member and capable of movement over a suitably fixed cam. Alternatively a hook capable of engaging the landing member may pull the landing member away from the backing member. The landing member may comprise a rectangular frame and the counterpoise may comprise a rod connected to the landing member, said rod being parallel to and rotatable about the pivot of the landing member.

In apparatus according to the present invention and specially adapted for carrying out the method of filling described in co-pending application Serial No. 279,329, the fixed cam or hook referred to above may be located beneath the liquid reservoir and adjacent the delivery end of a bag making machine capable of delivering bags of the kind referred to in co-pending application Serial No. 377,629 in horizontal parallel rows, so that a carrier passes the said delivery end vertically upwards with its locking plate in the horizontal plane. Transfer means may be provided for transferring a row of horizontal bags from the delivery end of the bag making machine.

The withdrawal means may comprise a conduit capable of being arranged in a downwardly inclined position with its uppermost end directly above the surface of any substance in the reservoir and with its lowermost end vertically above the container to be filled and a ladle rotatable about a horizontal axis so as to withdraw a volume of substance from the reservoir and eject it into said uppermost end of the conduit when the latter is in the downwardly inclined position.

The ladle may be rotatable through an arc of a circle. Preferably the horizontal axis about which the ladle rotates is a horizontal shaft located above the surface of the liquid in the reservoir. The ladle may be carried by a radial arm on this shaft. The conduit may be in the form of a trough which may carry a funnel at the end which is lowermost when the trough is in the downwardly inclined position. In one embodiment of the invention the trough constitutes the radial arm referred to above for carrying the ladle. In this embodiment ladle, trough and funnel are integral with one another, forming an assembly hereinafter referred to as "a dipper assembly."

Preferably a row of substantially identical dipper assemblies may be arranged in parallel on a common shaft thereby enabling a row of containers to be simultaneously filled. Such a row of dipper assemblies may be arranged to reciprocate continuously in synchronisation with the vertical movement of a succession of rows of containers to enable the succession of rows of containers to be filled. A row of containers may be filled by a row of dipper assemblies on a common shaft carried by the reservoir and means are provided for moving the reservoir parallel to and at the same speed as the vertically moving containers, preferably vertically upwards and downwards. In one embodiment of the apparatus according to the invention, means are provided for utilising the movement of the reservoir to bring about reciprocation of the shaft carrying the row of dipper assemblies.

Apparatus for carrying out the method of filling described in co-pending application Serial No. 279,329 should be provided with means for freezing a liquid or plastic substance after filling into the bag. Such freezing means may consist of a refrigerating chamber such as a blast tunnel through which a filled bag is arranged to travel, for example, by means of the carrier and the chains referred to above. In one embodiment of this apparatus the carriers are moved by the chains round an endless path which passes through the refrigerating chamber. Two sets of endless chains may be provided to bring about this movement. The first set is located wholly within the refrigerating chamber and may be arranged to traverse a zig-zag path from top to bottom of the chamber. The second set of chains may be arranged to move the carriers vertically past the reservoir. The carriers may be arranged to be transferred from the second set to the first set of chains inside and near the entrance to the refrigeration chamber and from the first set back to the second set inside and near the exit of the refrigerating chamber. A second cam plate may be provided near the exit of the refrigerating chamber for contacting the cam follower on the landing member of a carrier to cause this landing member to rotate away from the backing member to a horizontal position to allow the bag containing frozen liquid or plastic substance to be removed from the carrier, from a horizontal position.

When filling liquids consisting substantially of sugar solutions such as described in co-pending application Serial No. 279,329 the reservoir for liquid may be connected with suitable equipment for mixing the ingredients of the confection through a device such as a Votator for effecting pre-chilling of the mixed ingredients.

Figure 2:
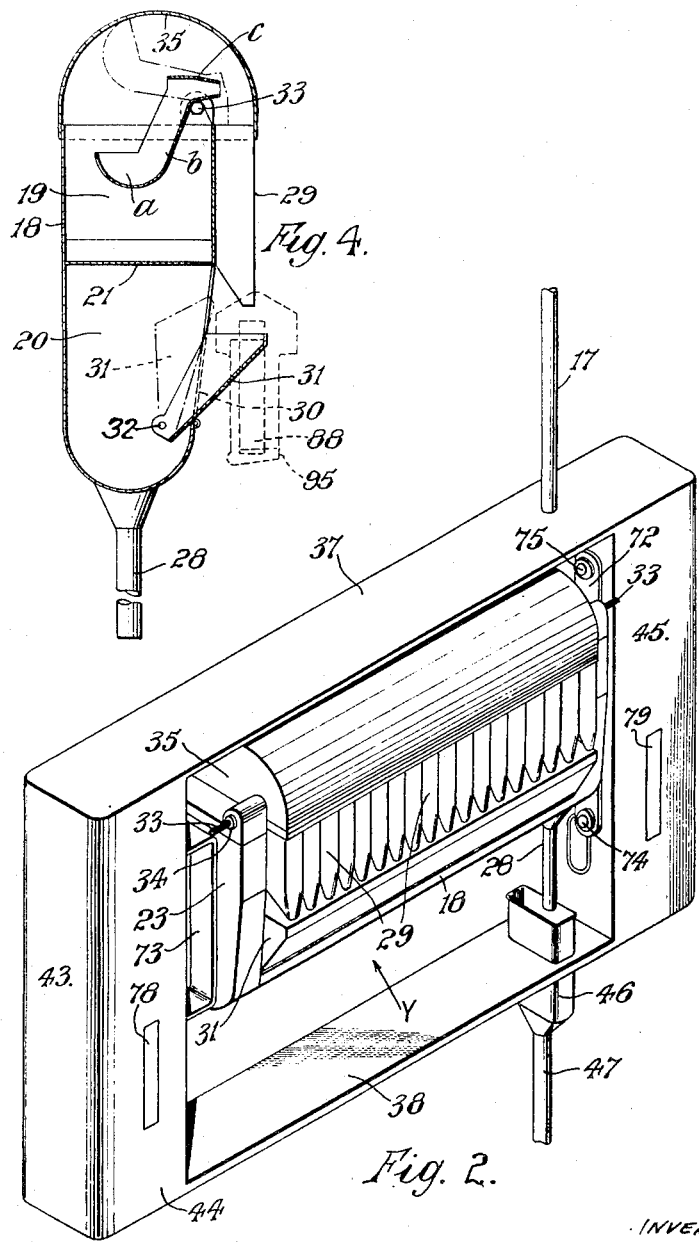
Figure 3:
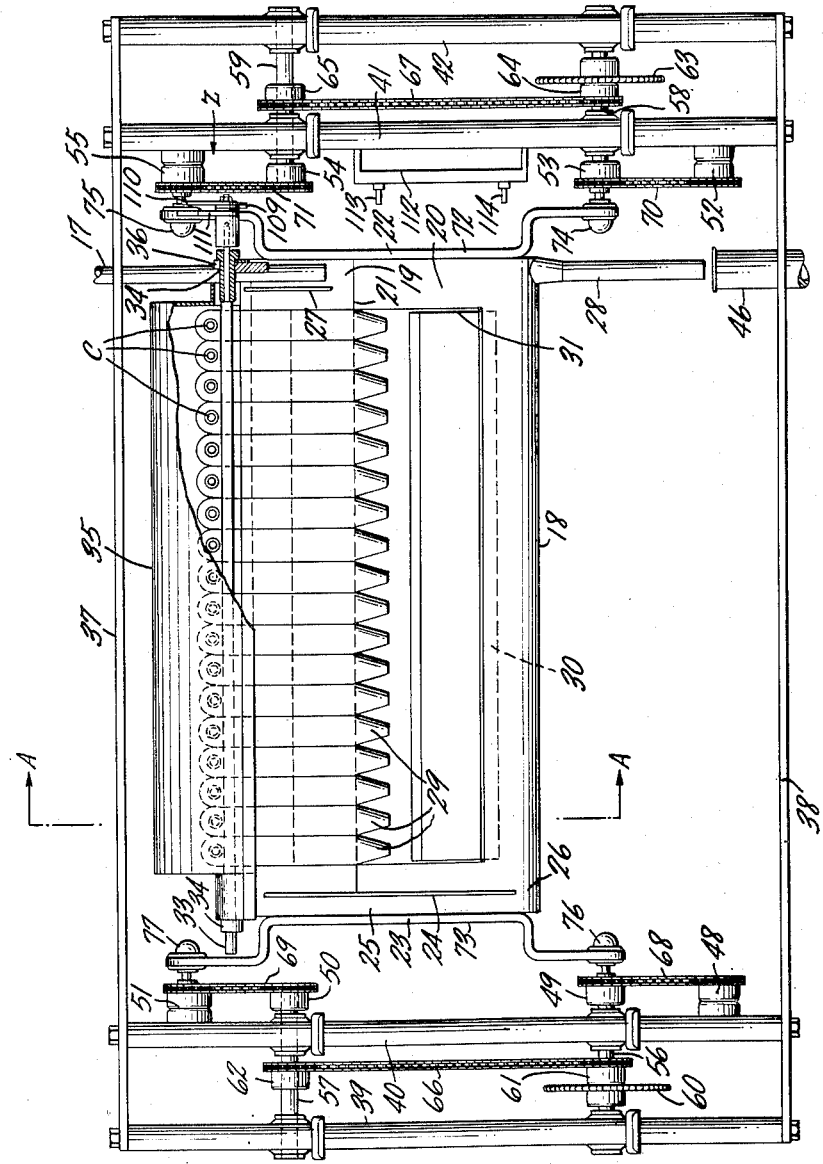
Figure 6:
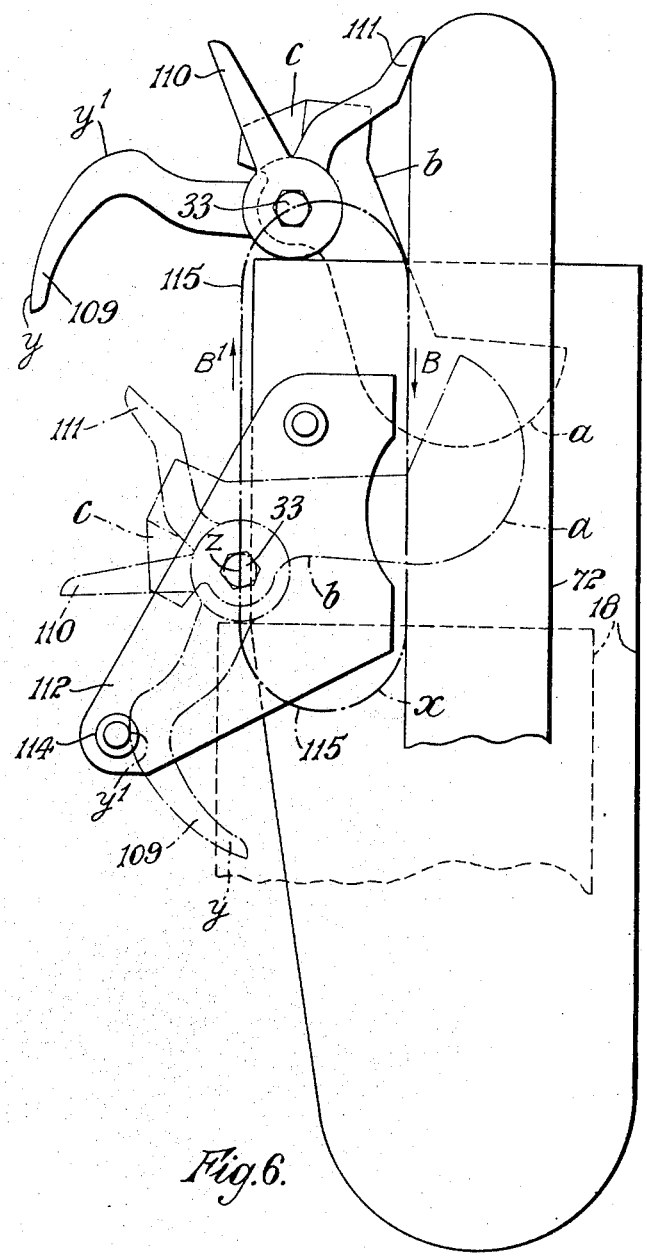

The invention will now be described with reference to the accompanying diagrammatic drawings in which:

Fig. 1 is a general arrangement in side view of an embodiment of apparatus according to the present invention, particularly suitable for carrying out the method of packaging described in co-pending application Serial No. 279,329, Fig. 2 is a perspective view of the filling device of Fig. 1 looking in the direction of the arrow X of Fig. 1, Fig. 3 is an elevation of the filling device of Fig. 1 looking in the direction of the arrow Y in Fig. 2, Fig. 4 is a section of the filling device of Fig. 1 on the line AA in Fig. 3, Fig. 5 is a perspective view of two consecutive carriers of Fig. 1 one of which carriers is in the closed position and the other in the open position, and Fig. 6 is a side view of a part of the filling device of Fig. 2 looking in the direction of the arrow Z in Fig. 3.

Referring to the drawings, there is shown an apparatus for filling a flowable substance, such as a liquid, plastic or free-flowing powder, into a container. Referring in particular to Fig. 1 a mixing vessel 1 provided with steam heating and water cooling means and an agitator is connected by a conduit 2 to a homogenizer 3 which discharges into a second mixing vessel 5 through a conduit 4. The latter vessel is also provided with an agitator. A third mixing vessel 6 provided with steam heating means and an agitator is connected to a pump 7 by a conduit 8 the pump being connected by conduit 9 to a cooler 10. This cooler discharges into the second mixing vessel 5 through a conduit 11. The second mixing vessel 5 is connected by a conduit 12 to the inlet of a Votator 13, the exit of which is connected by a conduit 14 to a small buffer tank 15. The latter discharges into a filling device 16 through the feed inlet 17 of the device.

The filling device 16 which is shown in more detail in Figs. 2, 3, 4 and 6, consists of a stainless steel reservoir tank 18 divided into an upper compartment 19 and a lower compartment 20 by a horizontal partition 21. This partition does not extend the whole distance between the side walls 22 and 23 (Fig. 3) of the tank 18 but is terminated a short distance from the wall 23 by a vertical baffle 24, the top of which is slightly below the top of the tank 18. The bottom edge of baffle 24 is a short distance above the bottom of the tank 18 so that a compartment 25 between the baffle 24 and the wall 23 communicates with the lower compartment 20 through a space 26 between the bottom of tank 18 and the lower edge of baffle 24. The feed inlet 17 from buffer tank 15 discharges into the upper compartment 19 at a point a short distance above the partition 21. A second vertical baffle 27 is provided as in Fig. 3 to ensure tranquil flow of liquid through the compartment 19. A discharge conduit 28 is provided in the bottom of the tank 18 near wall 22.

A row of elongated funnels 29 of non-contaminating plastic or metal alloy are mounted on a longitudinal wall of the tank 18 as in Figs. 2, 3 and 4. The wall of tank 18 carrying these funnels is provided with a rectangular aperture 30. A drip tray 31 can rotate under its own weight through this aperture about a pivot 32 from a position within compartment 20 represented by the broken lines in Fig. 4 to a position outside compartment 20 represented by the full lines in Fig. 4.

The drip tray is so dimensioned and located as to catch any liquid discharged through the row of funnels 29, when in the position represented by the full lines in Fig. 4, and causes such liquid to flow into compartment 20. It can be pushed from under the funnels into compartment 20 by a carrier advancing vertically upwards.

A hexagonal shaft 33 is supported in parallel with the longitudinal walls of tank 18 by suitable journals and bearings 34 on the top edge of side walls 22 and 23. This shaft carries a number of substantially identical and parallel dipper assemblies of a non-contaminating plastic or metal alloy. It also carries three levers 109, 110 and 111 as in Fig. 6 at the end nearest side wall 22.

Each dipper assembly consists of a hemi-spherical ladle $a$ connected by a trough $b$, inclined to the plane of the top edge of the ladle, to a short funnel $c$ as in Fig. 4. The trough $b$ of each dipper assembly is attached to the shaft 33 at a point near its junction with the short funnel $c$. The dipper assemblies are so arranged on the shaft and the shaft so located on tank 18 that every time the shaft rotates each dipper assembly rotates from the position shown by the full lines in Fig. 4, to that shown by the broken lines, and the delivery end of the funnel $c$ enters the top end of an elongated funnel 29.

A cover 35 fits over the top of the tank 18 and also over the tops of funnels 29 as in Fig. 4. The flat portion of the cover 35 near wall 22 is provided with a transverse slot 36 within which the feed inlet 17 can be reciprocated.

The tank 18 is movably supported within a fixed stainless steel guard assembly shown in Fig. 2. This assembly consists of a top plate 37 and a bottom plate 38 connected by four pillars 39, 40, 41 and 42 (Fig. 3). These pillars are enclosed by side and end plates of the guard assembly, only one end plate 43 and two side plates 44 and 45 being visible in Fig. 2. Bottom plate 38 carries a funnel 46 of rectangular cross section, which terminates in a conduit 47 connected to the inlet of the Votator 13 (Fig. 1). Discharge conduit 28 of tank 18 discharges the funnel 46 as in Fig. 2 and can be reciprocated from side to side thereof.

Pillars 40 and 41 each carry four sprocket wheels 48, 49, 50, 51 and 52, 53, 54, 55, respectively. Pillar 41 also carries a plate 112 shaped as in Fig. 6 and provided with two pins 113 and 114 spaced apart as in Fig. 3, pin 113 being shorter than pin 114. Shafts 56 and 57 are mounted in suitable bearings on pillars 39 and 40, and carry sprocket wheels 49 and 50 respectively whilst shafts 58 and 59 mounted in suitable bearings on pillars 41 and 42 carry sprocket wheels 53 and 54 respectively. Shaft 56 also carries two sprocket wheels 60 and 61 and shaft 57 carries a sprocket wheel 62. Likewise shaft 58 carries sprocket wheels 63, 64 and shaft 59 sprocket wheel 65. Pairs of sprocket wheels 61 and 62, 64 and 65, 48 and 49, 50 and 51, 52 and 53, and 54 and 55 are linked by endless chain drives 66, 67, 68, 69, 70 and 71, respectively.

The extremes of yoke plates 72 and 73, secured respectively to the sides 22 and 23 of the tank 18, are suitably machined to form journals for four gimbals, gimbals 74 and 75 being journalled to yoke plate 72 and gimbals 76 and 77, to yoke plate 73. Gimbals 74, 75, 76, 77 are secured respectively to chain drives 70, 71, 68 and 69. The arrangement of sprocket wheels and chain drives is actuated by main chain drives connecting sprocket wheels 60 and 63 to an electric motor (not shown) and passing through slots 78 and 79 provided in the side plates 44 and 45 respectively of the guard assembly as in Fig. 2.

The motor which drives sprocket wheels 60 and 63 of the filling device 16 also drives two sets of parallel endless chains 80 and 81 in timed relationship with the sprocket wheel and chain drive assembly of the filling device 16. The pair of endless parallel chains 80 are supported by a number of sprocket wheels denoted by 82 in Fig. 1, and the pair of chains 81 by sprocket wheels denoted by 83 in Fig. 1. The pair of chains 81 and sprocket wheels 83 are wholly within a refrigerating blast tunnel 84 with entry and exit ports 85 and 86 respectively. Two of the sprocket wheels 82 supporting chains 80 and two sprocket wheels 83 supporting chains 81 are arranged within the tunnel so that near the entry port 85 both sets of chains move vertically within the tunnel in close proximity to one another, chains 80 moving vertically downwards and chains 81 vertically upwards, as in Fig. 1. Similarly, near the exit port and within the tunnel two sprocket wheels 82 and two sprocket wheels 83 are so arranged that both sets of chains move vertically in close proximity to one another, only in this case chains 80 move vertically upwards and chains 81 move vertically downwards. The remaining sprocket wheels 83 are so arranged within the tunnel that the chains 81 travel along a zig-zag path through the tunnel from the top corner at the inlet port end to the bottom corner at the exit port end as in Fig. 1. The remaining sprocket wheels 82 are so arranged that the chains 80 enter and leave the inlet port of the tunnel horizontally then move vertically downwards, then horizontally under the tunnel to the exit port end, vertically upwards to the exit port, then horizontally in and out of the exit port of the tunnel, vertically downwards again and horizontally under the tunnel back to the inlet port end and vertically upwards to the inlet port, as in Fig. 1.

The filling device 16 is located alongside the upward path of the chains 80 to the tunnel inlet port 85 as in Fig. 1. A suitable bag making machine 87 for making bags of triangular cross-section from flexible material, such as paper, which has been rendered substantially leak-proof by coating it on the side which forms the internal side of the bag with a sealing composition, such as a heat-sealing lacquer is located beneath the filling device 16 as in Fig. 1. This machine is driven by the motor which drives chains 80, 81 and the chain drive and sprocket wheel assembly of filling device 16. The operation of the bag making machine is synchronised with the movement of the carriers on chains 80, 81 and with the movement of the dipper assemblies of the filling device 16. It delivers bags 88 in a horizontal row on to a platform 89 adjacent the upward path of the chains 80 to the tunnel inlet port 85 so that the bags lie on the platform with their principal axis perpendicular to the plane of the chains 80 as in Fig. 1. Fixed cam plates 90 are located approximately in line with the chains 80 on either side of the space between the chains and the platform 89. Each cam plate consists of a vertical metal strip inclined away from the machine 87 on the bottom part of the side nearest this machine as in Fig. 1.

The chains 80 and 81 carry equi-spaced support pins 92, four of which are shown in Fig. 5, a pin on one chain being located opposite a pin on the other chain of the pair as in Fig. 5.

Each pair of opposite support pins 92 on the chains 80 and 81 fit into triangulated trunnions 93 on the end brackets 94 of a frame 95 of a carrier. This frame constitutes the backing member referred to above. A succession of carriers are so supported by chains 80 and 81 as in Fig. 1, two of which are shown in Fig. 5. The end brackets 94 are joined together by three serrated bars 96 spaced apart one above the other. These three bars are each provided with a row of triangular serrations 97, the serrations of any one bar being in alignment with those of the other two bars as in Fig. 5. The serrations are so dimensioned and located as to accommodate a row of bags from the platform 89 of the bag making machine 87 of Fig. 1. The serrations in the bars 96 are so spaced and chains 80 are so located with respect to the filling device 16 that during the upward vertical movement of a carrier to the filling device 16, each bag accommodated by the serrations 97 is in alignment with a funnel 29 of the filling device. A rectangular frame 98 constituting the landing member referred to above is pivoted by fulcrum pins 99 to lugs 100 cast on the lower edge of the end brackets 94 as in Fig. 5. A counterpoise rod 102 of greater weight than frame 98 and bags placed thereon is linked to the short sides of the frame 98 by arms 101. This rod is parallel to the pivot line between frames 98 and 95 and rotatable about this pivot line between the position illustrated in the case of the lower carrier of Fig. 5 and the position illustrated in the case of the upper carrier of Fig. 5. A cam follower in the form of a pin 103 is fixed to the end of each arm 101 connected to the frame 98 and co-operates with the inclined edge of one or other of the cam plates 90 to move the frame 98 through an arc of a circle against the action of the counterpoise rod 102, as shown in the case of the top carrier of Fig. 5.

A second pair of fixed cam plates 107 are located one on either side of the chains 80 close to the point where these chains emerge from the exit port 86 of the blast tunnel 84. Each cam plate consists of a horizontal metal strip with a downwardly inclined taper away from the exit port 86 on the part of its lower side near the exit port as in Fig. 1. A transverse conveyor 108 is located beneath the untapered portions of these cam plates.

The operation of the arrangement is as follows:

The more viscous liquid part of the confection is formed and pasteurized in vessel 1 and homogenised and pumped to vessel 5 by homogeniser 3 through conduits 2 and 4. The less viscous liquid part of the confection is formed at about 65° C. in vessel 6 and conveyed by pump 7, conduits 8 and 9 to the top of cooler 10 where its temperature is reduced to about 15° C. From the cooler 10 it passes through conduit 11 to mixing vessel 5 where it is mixed with the more viscous part from tank 1. The liquid confection formed in tank 5 is then conveyed by conduit 12 to the Votator 13 in which its temperature is reduced to 0° C. The Votator 13 transfers the chilled but still liquid confection through conduit 14 to the buffer tank 15 which feeds the filling device 16 through feed inlet 17.

The liquid from feed inlet 17 flows under baffle 27 to fill compartment 19 of the tank 18 of the filling device 16 up to the level of the top of baffle 24. It then flows over baffle 24 into compartment 25, through space 26 into compartment 20 and then out of the tank back to the Votator through discharge conduit 28, funnel 46 and conduit 47 (Figs. 1 and 3). A constant head of liquid is thus maintained in the upper compartment 19 of tank 18.

Shaft 33 is reciprocated in a manner described later so that each dipper assembly rotates between the positions shown by the full and broken lines in Fig. 4. The rotation of shaft 33 is synchronised with the movement of the chains 80 so that when an assembly is in the position illustrated by the dotted lines in Fig. 4, one carrier 95 of the succession carried by chains 80 is at the bottom end of the funnels 29 as illustrated by the broken lines in Fig. 4.

The reciprocation of shaft 33 causes a ladle $a$ of each dipper assembly to withdraw a volume of liquid from the upper compartment 19 and transfer it by way of trough $b$, short funnel $c$, and funnel 29 into a bag 88 carried by the carrier 95, when the dipper assembly and carrier are in the positions denoted by the broken lines in Fig. 4. Should a carrier with a row of bags 88 not be in the position denoted by the broken lines in Fig. 4, the drip tray 31 will be in the position denoted by the full lines in Fig. 4 to catch any liquid, for example, drippings, from funnels 29. The liquid so caught will run into compartment 20, and from there by way of discharge conduit 28, funnel 46 and conduit 47 back to the Votator 13 for recirculation. When a carrier approaches the bottom of the funnels 29 the trunnions on the end brackets 94 push the drip tray 31 into compartment 20 of the tank 18; that is, to a position represented by the broken lines in Fig. 4, so that the drip tray does not impede the upward vertical movement of a carrier.

Whilst a row of bags is being filled with liquid as above, the tank 18 is moved around an endless path by the system of chain drives and sprocket wheels carried by pillars 39, 40, 41 and 42, the movement of the tank being synchronized with the movement of the carrier and the dipper assembly 34. Initially the tank is in its lowermost position with the gimbals 74, 75, 76 and 77 at the bottom of sprocket wheels 52, 54, 48 and 50, respectively, and the funnels 29 project beyond the plane of the side plates 44 and 45 of the fixed guard assembly. At this point the dipper assembly 34, drip tray 31 and a carrier 95 with a row of bags 88 are in the positions represented by the broken lines in Fig. 4. As liquid runs from the ladles $a$ to the bags 88 by way of troughs $b$ and funnels $c$ and 29, the tank 18 moves vertically upwards under the action of chains 68, 69, 70 and 71 at the same speed as the carrier 95 which moves vertically upwards under the action of chains 80. When the ladles $a$ are empty, the tank 18 is in the position shown in Fig. 3. It then recedes into the guard assembly to permit the carrier 95 to pass the guard assembly. Afterwards it moves vertically downwards until the gimbals 74, 75, 76 and 77 are at the bottom of sprocket wheels 52, 54, 48 and 50 respectively, once more. During this recession and downward movement drip tray 31 has dropped into the position shown by the full lines in Fig. 4. Also the dipper assemblies 34 have rotated from the position shown by the broken lines in Fig. 4 to that shown by the full lines. As the gimbals 74, 75, 76 and 77 continue to move round the sprocket wheels 52, 54, 48 and 50 respectively, tank 18 moves once more to its initial position with the funnels 29 projecting beyond the plane of the side plates 44 and 45. In the meantime, the dipper assemblies have rotated back to the position shown by the broken lines in Fig. 4. Also another carrier 95 with its row of bags 88 has by now advanced vertically to the position represented by the broken lines in Fig. 4. The sequence of operations described above is now repeated, so that the upward vertical movement of a row of containers is not arrested during filling.

The movement of tank 18 round the endless path causes the shaft 33 to travel around the path represented by the heavy broken lines 115 in Fig. 6 in the direction of the arrows B, B'. Initially when the tank 18 and dipper assembly 34 are in the upper part of path 115 the levers 109, 110 and 111 are in the positions represented by the unbroken lines in Fig. 6. In this position lever 111 strikes yoke plate 72 and as tank 18 moves downwards it maintains contact with the yoke plate, thereby ensuring that the ladles $a$ of the dipper assembly are maintained at a constant distance below the surface of the liquid in tank 18 during the downward movement of this tank. When shaft 33 reaches the point $x$ in the path 115 the point $y$ on lever 109 strikes pin 114. As the shaft 33 continues to move around path 115, lever 109 remains in contact with pin 114 and as a consequence of this contact and further movement of tank 18 and shaft 33, shaft 33 is rotated to cause the ladle $a$ of the dipper assembly to move upwardly over an arc of a circle and out of the liquid in tank 18. By the time shaft 33 reaches point $z$ on path 115 the dipper assembly will have assumed the position represented by the wholly broken lines in Fig. 6 and all the liquid withdrawn by ladle $a$ during the rotation of the shaft 33 will have run from the ladle into the bag to be filled. At this point pin 114 is in contact with lever 109 at the point $y'$ as in Fig. 6. As the shaft 33 continues to move upward from point $z$ along path 115 point $y'$ moves away from pin 114 which remains in contact with the lever until point y again reaches the pin. This movement of the lever against pin 114 causes the shaft 33 and dipper assembly to rotate in the opposite direction until when point y passes the pin 114 contact between the lever and pin is broken. The dipper assembly then drops until the ladle a is once more below the liquid level in the tank 18, and lever 111 again in contact with yoke plate 72 to locate the ladle in the same position as before. The sequence of operations is then repeated. In the event of shaft 33 sticking in its bearing so that ladle a does not submerge, pin 113 and lever 110 are provided so that during the downward movement of shaft 33 over path 115 lever 110 strikes pin 113 thereby overcoming any resistance to rotation of shaft 33 in its bearings to ensure that ladle a is submerged in the liquid in tank 18.

A row of bags 88 from the platform 89 are filled on a carrier whilst it is moved by the chains 80 past the bag making machine 87 in Fig. 1. An empty carrier returning from underneath the blast tunnel 84 approaches the platform vertically. When the carrier is a short distance from the platform the pins 103 on the arms 101 of the carrier contact the inclined sides of cam plates 90. As the carrier moves upwards, the movement of the pins on the incline of the cam plates causes the frame 98 to rotate away from frame 95 against the action of the counterpoise rod 102. When the pins have reached the end of the inclines of the cam plates the frame 98 has moved through 90° and its plane is now horizontal. The carrier continues to move upwards with the pins 103 travelling along the vertical part of the cam plate, thereby maintaining the frame 98 normal to frame 95. When the carrier passes the platform 89 a suitable transfer device operates to deposit a row of bags from the platform on to the frame 98 of the moving carrier, each bag being aligned with the serrations 97 in the bar 96. For the sake of clarity only two bags 88 of such a row are shown on frame 98 in Fig. 5, but in actual practice the number of bags in a row would correspond to the number of serrations 97 in a bar 96. As the carrier continues its upward movement the pins 103 are released from the action of the cam plate. Since the force operating against the counterpoise rod 102 is thus removed, the counterpoise rod drops to a position beneath the frame 95; that is, from a position illustrated in the case of the top carrier of Fig. 5 to a position illustrated in the case of the bottom carrier of Fig. 5. In doing so, it causes frame 98 and the row of bags 88 thereon to rotate through 90° until frame 98 once more makes face-to-face contact with frame 95. The bags 88 are thus rotated into a vertical position, each bag being accommodated in the serrations 97 of frame 95, a position illustrated by the broken lines in the case of the top carrier of Fig. 5. The bags are thus supported between the two frames which are held face-to-face by the counterpoise rod and are so conveyed for the subsequent filling and chilling operations.

The carrier continues its upward vertical movement on chains 80 past the filling device 16 where the bags are filled in the manner already described and then passes into the inlet port 85 of the tunnel 84. As a carrier moves vertically downwards on chains 80 within the tunnel the trunnions 93 on brackets 94 are embraced by the chains 81 which are driven vertically upwards at the same speed as chains 80 by the electric motor which drive chains 80. Support pins 92 on opposite chains 81 thereupon enter the trunnions 93 of the carrier and as these pins are moving upwards, they lift the trunnions off the downwardly moving support pins of chains 80, the carrier thereby being transferred from chains 80 to chains 81. Alternatively, instead of being transferred directly from one set of chains to another, a carrier may be taken off one set of chains by engagement between its trunnions and a pair of stationary pins. The carrier is momentarily supported on these stationary pins until removed by engagement between a pin on the second set of chains and its trunnions. Chains 81 then convey the carrier through the tunnel over the zig-zag path shown in Fig. 1. Conditions in the tunnel are such that the liquid confection filled into the bags is frozen by the time a carrier reaches the vicinity of the exit port 86. At the exit port the chains 81 move vertically downwards and the chains 80 vertically upwards at the same speed. The latter chains now embrace the carrier and support pins on these chains now lift the carrier off the support pins of chains 81, the carrier being thereby transferred from chains 81 to chains 80. The latter chains convey the carrier out of the tunnel along a horizontal path. When a carrier is moving along this path, the pins 103 on the carrier encounter the inclined side of cam plates 107, thereby causing the landing member 98 to rotate away from the backing member in a similar manner to that already described in the case of cam plates 90. A suitable transfer mechanism removes the bags 88 from the carrier to a conveyor 108 which conveys the bags of frozen confection from the vicinity of the blast tunnel. The open ends of the bags containing the frozen confection are then sealed in any suitable manner and the bags assembled into bundles, packed into cans and transferred to cold storage.

After the bags from a carrier have been transferred to conveyor 108, the carrier continues its horizontal movement and the pins 103 are released from the action of the cam plates 107. Counterpoise rod 102 drops once more to cause landing frame 98 to rotate through 90° until it once more contacts the backing frame as in the case of the lower carrier of Fig. 5. The empty carrier is then conveyed vertically downwards and underneath the blast tunnel by chains 80 to a point beneath the platform 89 and the sequence of operations of the carrier described above is repeated.

In an alternative arrangement for opening a carrier to receive a row of bags to be filled a hook connected by a crankshaft to a trip lever is arranged to engage a pin of an upwardly moving carrier. The hook-trip lever assembly is supported on a platform slidable up and down on suitable guides. The trip lever is in engagement with the edge of a cam plate, and the lower part of this edge of the cam plate is so designed that the trip lever prevents the hook from coming out of engagement with the pin. As the carrier moves upwards the hook pulls the frame 98 away from frame 95 against the action of the counterpoise rod 102 so that frame 98 can receive bags from the bag making machine as previously. Once frame 98 is in the open position, that is at 90° to frame 95, a roller on the chain 80 opposite the pin 103 supporting the next carrier in the succession engages a dog hinged to the platform carrying the hook-lever assembly. This dog carries a roller which is in engagement with the face of the cam plate. The platform and assembly then move upwards with the carrier under the action of the roller engaging the dog. The edge of the cam plate engaged by the trip-lever is shaped so that as the lever moves upwards it receives a sudden rotation and causes the hook to become disengaged from pin 103. When this happens, the carrier closes under the action of the counterpoise rod as previously described. After the carrier has closed the roller on the dog hinged to the platform encounters a cut-away part of the face of the cam plate. The movement of the roller over the cut-away part causes the dog to rotate about its hinge on the platform and move out of engagement with the roller on chain 80. The platform carrying the hook and trip lever drops back to its original position, springs being provided on the guides to assist this descent. To prevent knocking a dash pot may be attached to the platform. An arrangement such as is described above may be provided at each side of the chains 80 conveying the carriers.

We claim:

1. Apparatus for filling a flowable substance into a container which apparatus includes a reservoir for the substance, a succession of carriers each arranged to support a row of containers in an upright position, means for moving the carriers round an endless path so that each container moves vertically past and alongside the reservoir with the axis passing through its open and closed ends substantially vertical and withdrawal means for withdrawing from said reservoir a predetermined quantity of substance and transferring the withdrawn substance into the moving container from a point in the path of and above the moving container.

2. Apparatus for filling a flowable substance into a container which apparatus includes a reservoir for the substance, a succession of carriers, each carrier consisting of a backing member suitably serrated to accommodate the cross-sectional shape of a container, a landing member pivotally connected thereto, and a counterpoise under the action of which the landing member is capable of being held in contact with the serrated face of the backing member so as to clamp a row of containers in an upright position within the serrations, driven parallel endless chains between which a backing member of a carrier is suspended so that it always hangs in the vertical plane, the chains being so located with respect to the reservoir that each container moves vertically past and alongside the reservoir with the axis passing through its open and closed ends substantially vertical, and withdrawal means for withdrawing from said reservoir a predetermined quantity of substance and transferring the withdrawn substance into the moving container from a point in the path of and above the moving container.

3. Apparatus for filling a flowable substance into a container which apparatus includes a reservoir for the substance, a succession of carriers, each carrier consisting of a rectangular backing frame suitably serrated to accommodate the cross sectional shape of a container, a rectangular landing frame pivotally connected to the backing frame, a counterpoise rod carried by the landing frame and parallel to and rotatable about the pivot of the landing frame, under the action of which rod the landing frame is capable of being held in contact with the serrated face of the backing frame so as to clamp a row of containers in an upright position within the serrations, means for causing the landing frame to rotate through 90° away from the backing frame against the action of the counterpoise rod, driven parallel endless chains between which a backing member of a carrier is suspended so that it always hangs in the vertical plane, the chains being so located with respect to the reservoir that each container moves vertically past and alongside the reservoir with the axis passing through its open and closed ends substantially vertical, and withdrawal means for withdrawing from said reservoir a predetermined quantity of substance and transferring the withdrawn substance into the moving container from a point in the path of and above the moving container.

4. Apparatus for filling a flowable substance into a container, which apparatus includes a reservoir for the substance, a succession of carriers, each carrier consisting of a backing member suitably serrated to accommodate the cross-sectional shape of a container, a landing member pivotally connected thereto, and a counterpoise under the action of which the landing member is capable of being held in contact with the serrated face of the backing member so as to clamp a row of containers in upright position within the serrations, a refrigerating chamber, a first pair of driven endless parallel chains for conveying a carrier through the chamber, a second pair of driven endless parallel chains for conveying a carrier from the exit of the chamber to the entrance of the chamber, the second set of chains being so located with respect to the reservoir that each container moves vertically past and alongside the reservoir with the axis passing through its open and closed ends substantially vertical, means for transferring a carrier from the second pair of chains to the first pair at the entrance of the chamber, means for transferring a carrier from the first set of chains to the second pair at the exit of the chamber, and withdrawal means for withdrawing from said reservoir a predetermined quantity of substance and transferring the withdrawn substance into the moving container from a point in the path of and above the moving container.

5. Apparatus for filling a flowable substance into a container which apparatus includes a reservoir for the substance, a succession of carriers each arranged to support a row of containers in an upright position, means for moving the carriers round an endless path so that each container moves vertically past and alongside the reservoir with the axis passing through its open and closed ends substantially vertical, a horizontal shaft above the surface of the substance in the reservoir, a row of parallel troughs, each trough constituting a radial arm of the shaft, a row of funnels each carried by a trough at its end attached to the shaft, a row of ladles, each carried by a trough at its end distant from the shaft, means co-operating with the means for moving the carriers for reciprocally rotating the shaft to move the row of troughs between a position in which each ladle is immersed in the substance in the reservoir and a position in which each trough is downwardly inclined with its funnel vertically above a container in a row of containers supported by a carrier and in which a ladle ejects any substance withdrawn by it from the reservoir into its downwardly inclined trough down which it flows into the funnel and then into a container.

6. Apparatus for filling a flowable substance into a container which apparatus includes a reservoir for the substance, a conveyor for moving vertically upwards past and alongside the reservoir a succession of rows of containers with the axis of each container passing through its open and closed ends substantially vertical, means co-operating with the conveyor for moving the reservoir parallel to and at the same speed as a vertically moving row of containers, a horizontal shaft above the surface of the substance in the reservoir and carried by the reservoir, a row of parallel troughs, each trough constituting a radial arm of the shaft, a row of ladles, each carried by a trough at its end distant the shaft, means co-operating with the conveyor and means for moving the reservoir for reciprocally rotating the shaft to move the row of troughs between a position in which each ladle is immersed in the substance in the reservoir and a position in which each trough is downwardly inclined with its funnel vertically above a container in a row of containers carried by the conveyor and in which a ladle ejects any substance withdrawn by it from the reservoir into its downwardly inclined trough down which it flows into the funnel and then into a container.

7. Apparatus for filling a flowable substance into a container which apparatus includes a reservoir for the substance, a conveyor for moving vertically upwards past and alongside the reservoir a succession of rows of containers with the axis of each container passing through its open and closed ends substantially vertical, means co-operating with the conveyor for moving the reservoir parallel to and at the same speed as a vertically moving row of containers, a horizontal shaft above the surface of the substance in the reservoir and carried by the reservoir, a row of parallel troughs, each trough constituting a radial arm of the shaft, a row of ladles, each carried by a trough at its end distant the shaft, means utilising the movement of the reservoir to bring about reciprocal rotation of the shaft to move the row of troughs between a position in which each ladle is immersed in the substance in the reservoir and a position in which each trough is downwardly inclined with its funnel vertically above a container in a row of containers carried by the conveyor and in which a ladle ejects any substance withdrawn by it from the reservoir into its downwardly inclined trough down which it flows into the funnel and then into a container.

8. Apparatus for filling a flowable substance into a container which apparatus includes a reservoir for the substance, a succession of carriers each arranged to support a row of containers in an upright position, each carrier consisting of a rectangular backing frame suitably serrated to accommodate the cross sectional shape of a container, a rectangular landing frame pivotally connected to the backing frame, a counterpoise rod carried by the landing frame and parallel to and rotatable about the pivot of the landing frame, under the action of which rod the landing frame is capable of being held in contact with the serrated face of the backing frame so as to clamp a row of containers in an upright position within the serrations, means for causing the landing frame to rotate through 90° away from the backing frame against the action of the counterpoise rod, a refrigerating chamber, two pairs of driven endless parallel chains between which a backing frame and a carrier is suspended so that it always hangs in the vertical plane, the first pair of chains being located within the refrigerating chamber and the second pair being located so as to convey a carrier from the exit of the chamber to the entrance thereof and so that each container moves vertically upwards past and alongside the reservoir with the axis passing through its open and closed ends substantially vertical, means for transferring a carrier from the second pair of chains to the first pair at the entrance of the chamber, means for transferring a carrier from the first pair of chains to the second pair at the exit of the chamber, means co-operating with the driven endless chains for moving the reservoir parallel to and at the same speed as a vertically moving row of containers, a horizontal shaft above the surface of the substance in the reservoir and carried by the reservoir, a row of parallel troughs, each trough constituting a radial arm of the shaft, a row of funnels each carried by a trough at its end attached to the shaft, a row of ladles, each carried by a trough at its end distant the shaft, means co-operating with the driven endless chains and means for moving the reservoir for reciprocally rotating the shaft to move the row of troughs between a position in which each ladle is immersed in the substance in the reservoir and a position in which each trough is downwardly inclined with its funnel vertically above a container in a row of containers supported by a carrier and in which a ladle ejects any substance withdrawn by it from the reservoir into its downwardly inclined trough down which it flows into the funnel and then into a container.

9. Apparatus for filling a flowable substance into a container which includes a reservoir for the substance, means for moving vertically past and alongside the reservoir a succession of rows of containers each with the axis passing through its open and closed ends substantially vertical, and means for filling a row of predetermined and substantially equal quantities of the substance from the reservoir into each row of containers in the succession.

10. Apparatus for filling a flowable substance into a container which includes a reservoir for the substance, means for moving vertically past and alongside the reservoir a succession of rows of containers each with the axis passing through its open and closed ends substantially vertical, means for withdrawing rows of predetermined and substantially equal volumes of the substance in succession from the reservoir and transferring each row of withdrawn volumes to a row of points each directly in the path of and above each moving container of a row of containers so that each volume in the row flows simultaneously substantially vertically downwards into the row of containers, and means for synchronising the withdrawal, transfer and downward vertical movement of the rows of withdrawn volumes with the movement of the rows of containers.

11. Apparatus for filling a flowable substance into a container which includes a reservoir for the substance, means for moving vertically past and alongside the reservoir a succession of rows of containers each with the axis passing through its open and closed ends substantially vertical, means for moving a succession of rows of predetermined and substantially equal volumes of the substance each parallel to itself through an arc of a circle to a position above the surface of the substance in the reservoir and for transferring along a downwardly sloping path each row of withdrawn volumes to a row of points each directly in the path of and above each moving container of a row of containers so that each volume in a row flows simultaneously substantially vertically downwards into the row of containers, and means for synchronising the withdrawal, transfer and downward vertical movement of the rows of withdrawn volumes with the movement of the rows of containers.

12. Apparatus for filling a flowable substance into a container which includes a reservoir for the substance, means for moving vertically upwards past and alongside the reservoir a succession of rows of containers each with the axis passing through its open and closed ends substantially vertical, means for moving a row of predetermined substantially equal volumes of the substance each parallel to itself through an arc of a circle to a position above the surface of the substance in the reservoir and for transferring along a downwardly sloping path each row of withdrawn volumes to a row of points each outside the periphery of the reservoir and each directly in the path of and above each moving container of a row of containers so that the volumes in the row flow simultaneously substantially vertically downwards into the row of containers, means for moving the reservoir vertically upwards along a path parallel to that of the containers when the transfer and downward vertical movement of the rows of withdrawn volumes is proceeding, and means for synchronising the withdrawal, transfer and downward vertical movement of the rows of withdrawn volumes and the movements of the reservoir with the movement of the rows of containers.

13. Apparatus for filling a flowable substance into a container which includes a reservoir for the substance, means for moving vertically past and alongside the reservoir and over an endless path a succession of carriers, each supporting a row of containers, so that each container in a row passes the reservoir with the axis passing through its open and closed ends substantially vertical, and means for filling a row of predetermined and substantially equal quantities of the substance from the reservoir into each row of containers.

14. Apparatus for preparing a frozen confection from liquid ingredients which includes a reservoir for the liquid ingredients, a carrier, means for moving the carrier around an endless path during an upward vertical traverse of which it passes the reservoir, means for placing a row of containers on the moving carrier so that when the carrier moves past the reservoir the axis passing through the open and closed ends of each container is substantially vertical, means for filling a row of predetermined and substantially equal quantities of liquid ingredients from the reservoir into the row of containers, means for solidifying the liquid ingredients in the rows of containers on the moving carrier, and means for removing the row of containers containing the frozen ingredients from the moving carrier.

15. Apparatus for preparing a frozen confection from liquid ingredients which includes a reservoir for the liquid ingredients, a carrier, means for moving a carrier around an endless path during an upward vertical traverse of which it passes the reservoir, means for assembling a row of containers with the axis passing through the open and closed ends of each container substantially horizontal and placing the assembled row of containers on the moving carrier, means associated with the carrier for rotating the row of containers through 90° during the upward vertical traverse of its path by the carrier, so that when the carrier passes the reservoir the beforementioned axis of each container is substantially vertical, means for filling a row of predetermined and substantially equal quantities of liquid ingredients from the reservoir into the row of containers, means for solidifying the liquid ingredients in the rows of containers on the moving carrier, and means for removing the row of containers containing the frozen ingredients from the moving carrier.

16. Apparatus for preparing a frozen confection from liquid ingredients which includes a reservoir containing chilled liquid ingredients including a substantial proportion of sugar solution, a succession of carriers, means for moving the carriers around an endless path during an upward vertical traverse of which each carrier passes the reservoir, means for assembling in succession rows of substantially leak-proof bags of flexible material with the axis passing through the open and closed ends of each bag substantially horizontal, means for placing one assembled row of bags on a moving carrier, means associated with a carrier for rotating the row of bags through 90° during the upward vertical traverse of the path by the carrier so that when the carrier passes the reservoir the before-mentioned axis of each bag is substantially vertical, means for moving a row of predetermined and substantially equal volumes of liquid from the reservoir parallel to itself through an arc of a circle to a position above the surface of the liquid in the reservoir and for transferring along a downwardly sloping path each row of withdrawn volumes to a row of points each outside the periphery of the reservoir and each directly in the path of and above each moving bag of a row of bags on a carrier so that the volumes in the row flow simultaneously substantially vertically downwards into the row of bags, means for solidifying the liquid in each row of bags carried by a moving carrier, and means for removing the row of bags containing the frozen substance from the moving carrier.

References Cited in the file of this patent

UNITED STATES PATENTS

| Number | Name | Date |
|---|---|---|
| 825,598 | Graham | July 10, 1906 |
| 997,145 | Lines | July 4, 1911 |
| 1,284,948 | Thornburgh | Nov. 12, 1918 |
| 1,313,793 | Dalton | Aug. 19, 1919 |
| 1,791,825 | Maxwell | Feb. 10, 1931 |
| 1,894,007 | Schmidt | Jan. 10, 1933 |
| 1,952,101 | Snodgrass | Mar. 27, 1934 |
| 1,955,441 | Schnaier | Apr. 17, 1934 |
| 2,024,130 | Kronbach | Dec. 10, 1935 |
| 2,106,076 | Thomas | Jan. 18, 1938 |
| 2,521,403 | Overland | Sept. 5, 1950 |
| 2,604,249 | Gorham | July 22, 1952 |